United States Patent
Carrier et al.

(10) Patent No.: US 7,090,113 B2
(45) Date of Patent: Aug. 15, 2006

(54) INERTIA WELDED SHAFT AND METHOD THEREFOR

(75) Inventors: Charles William Carrier, West Chester, OH (US); Gary Mac Holloway, Cincinnatti, OH (US); Charles Robert Wojciechowski, West Chester, OH (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 10/803,394

(22) Filed: Mar. 18, 2004

(65) Prior Publication Data

US 2005/0001015 A1 Jan. 6, 2005

Related U.S. Application Data

(62) Division of application No. 10/118,191, filed on Apr. 8, 2002, now Pat. No. 6,749,518.

(51) Int. Cl.
*B23K 20/12* (2006.01)
*B23K 31/02* (2006.01)

(52) U.S. Cl. ........... 228/113; 228/114; 228/114.5
(58) Field of Classification Search ........... 228/113, 228/112.1, 114, 114.5, 2.1; 219/59.1, 60 A, 219/159, 244, 652; 428/660, 680; 464/181–183
See application file for complete search history.

(56) References Cited

U.S. PATENT DOCUMENTS

| | | | |
|---|---|---|---|
| 3,798,011 A | * | 3/1974 | Sharp, Jr. .......... 138/143 |
| 4,964,564 A | | 10/1990 | Neal et al. |
| 5,271,287 A | * | 12/1993 | Wadleigh ............ 74/439 |
| 5,277,661 A | * | 1/1994 | Mak et al. ............ 464/182 |
| 5,419,578 A | | 5/1995 | Storey et al. |
| 5,425,494 A | | 6/1995 | Rosenthal et al. |
| 5,826,331 A | * | 10/1998 | Myers et al. ........ 29/888.09 |
| 5,937,708 A | | 8/1999 | Ito et al. |
| 6,131,797 A | | 10/2000 | Gasdaska et al. |
| 6,138,896 A | | 10/2000 | Ablett et al. |
| 6,210,283 B1 | * | 4/2001 | Wojciechowski et al. ... 464/181 |
| 6,234,912 B1 | | 5/2001 | Koschier et al. |
| 6,240,720 B1 | | 6/2001 | Tseng et al. |
| 6,273,474 B1 | * | 8/2001 | DeLange et al. ........ 285/55 |
| 6,276,124 B1 | | 8/2001 | Soh et al. |
| 6,291,086 B1 | * | 9/2001 | Nguyen-Dinh ....... 428/660 |
| 6,328,198 B1 | | 12/2001 | Ohashi et al. |
| 6,514,631 B1 | * | 2/2003 | Yamamoto et al. ...... 428/682 |

* cited by examiner

*Primary Examiner*—L. Edmondson
(74) *Attorney, Agent, or Firm*—Armstrong Teasdale LLP; William Scott Andes

(57) ABSTRACT

A method is provided for assembling a shaft having a metal matrix composite mid shaft and monolithic high strength alloy forward and aft shafts. The forward and aft shafts are each inertia friction welded to separate annular transition pieces which include a barrier layer operative to prevent the formation of intermetallic compounds. Special tooling is used to avoid applying shear stresses to the transition piece during welding. The welded forward and aft subassemblies are subsequently heat treated before inertia friction welding them to the mid shaft.

7 Claims, 5 Drawing Sheets

INERTIA WELDED SHAFT AND METHOD THEREFOR

CROSS REFERENCE TO RELATED APPLICATIONS

This application is a Division of application Ser. No. 10/118,191, filed Apr. 8, 2002, now U.S. Pat. No. 6,749,518.

STATEMENT REGARDING FEDERALLY SPONSORED RESEARCH & DEVELOPMENT

The U.S. Government may have certain rights in this invention pursuant to contract number F33615-94-2-4439 awarded by the Department of the Air Force.

BACKGROUND OF THE INVENTION

The present invention relates generally to gas turbine engines, and, more specifically, to rotors or drive shafts therein.

An aircraft gas turbine engine typically includes one or more drive shafts for transferring torque from one rotating component to another. For example, in a turbofan engine, the fan is driven by the low pressure turbine (LPT) by a first drive shaft, and the compressor is driven by the high pressure turbine (HPT) by a second drive shaft disposed concentrically around the first drive shaft.

The drive shafts must be formed of suitable high temperature, high strength materials for carrying loads during operation at elevated temperatures. Both shafts are subject to torsion loads as the turbines drive the corresponding fan and compressor. The pressure forces acting across the fan, compressor, and turbines place the corresponding drive shafts under tension during operation. The drive shafts are also subject to bending and gravity loads as the engine elastically deflects during aircraft movement.

Various forms of composite materials are being developed for use in such shafts for reducing the overall weight of the engine while maintaining suitable strength under the specific operating conditions, for example titanium metal matrix composites. However, shafts constructed from composite materials typically must include monolithic metallic end pieces at the required mechanical joints in the engine such as bolted flange joints or spline joints, which are used to connect the drive shafts to the other components of the engine.

These monolithic end pieces can not be bonded directly to the composite portions of the shaft, because this would result in the formation of intermetallic compounds at the interfaces between the dissimilar materials, causing brittleness and unpredictability in the joint properties. It is known to avoid the formation of intermetallic compounds by using a layered transition piece which incorporates a barrier material such as a niobium alloy.

These transition pieces have relatively lower strengths than the other components of a shaft. Therefore, the transition pieces must be processed in a manner to avoid any damage or weakening thereof, in order to preserve an adequate overall margin of strength in the completed shaft. Furthermore, in order to obtain high strength levels in the monolithic end pieces of the shaft, they must be properly heat treated, without subjecting the metal matrix composite components to excessive temperatures.

Accordingly, it is desired to provide an improved gas turbine engine drive shaft having reduced weight while maintaining stiffness and strength at elevated temperature, and including suitable mechanical joints for connection with adjoining components.

BRIEF SUMMARY OF THE INVENTION

The above-mentioned need is met by the present invention, which provides a method for assembling a shaft having a metal matrix composite mid shaft and monolithic high strength alloy forward and aft shafts. The forward and aft shafts are each inertia friction welded to separate annular transition pieces which include a barrier layer operative to prevent the formation of intermetallic compounds. Special tooling is used to avoid applying shear stresses to the transition piece during welding. The welded forward and aft subassemblies are subsequently heat treated before inertia friction welding them to the mid shaft.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
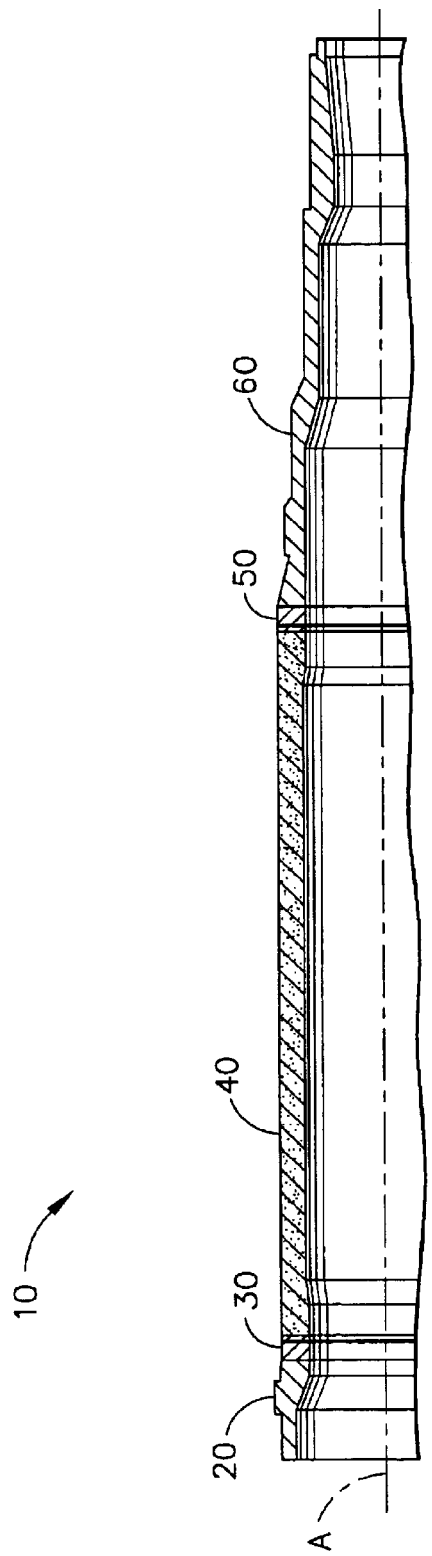
FIG. 1 shows a half cross-sectional view of a finished shaft constructed in accordance with the present invention.

Referring to the drawings wherein identical reference numerals denote the same elements throughout the various views, FIG. 1 illustrates an exemplary shaft 10 which is an integral assembly of several generally annular components disposed coaxially about a centerline A, including sequentially from front to rear: a forward shaft 20, a first transition piece 30, a composite mid shaft 40, a second transition piece 50, and an aft shaft 60.

The forward shaft 20 and the aft shaft 60 are monolithic components constructed from a metal alloy capable of being heat treated to achieve high strength. Examples of suitable alloys include high-strength nickel-based alloys such as INCO alloy 718 or THERMO-SPAN alloy. The forward and aft shafts have suitable features for attaching them to other components in the engine. For example, the forward shaft 20 may be attached to the fan rotor (not shown) and the aft shaft 60 may be joined to the low pressure turbine (not shown) by splined or bolted joints.

The mid shaft 40 is constructed from a metal matrix composite (MMC). In the illustrated example the mid shaft 40 comprises a titanium matrix with reinforcing fibers embedded therein. Suitable metal matrix composites are commercially available. For example, the reinforcing fibers may be silicon coated carbon, silicon carbide, or tungsten fibers integrally formed in the titanium matrix. This MMC and others are commercially available from Textron, Inc., Lowell, Mass.; Atlantic Research Co., Wilmington, Mass.; and 3M Company, Minneapolis, Minn. They have a modulus of elasticity of about $29-32\times10^6$ psi, for example, which is about double that of a conventional monolithic titanium drive shaft. The drive shaft may therefore be made thinner and lighter for comparable strength.

Figure 2:
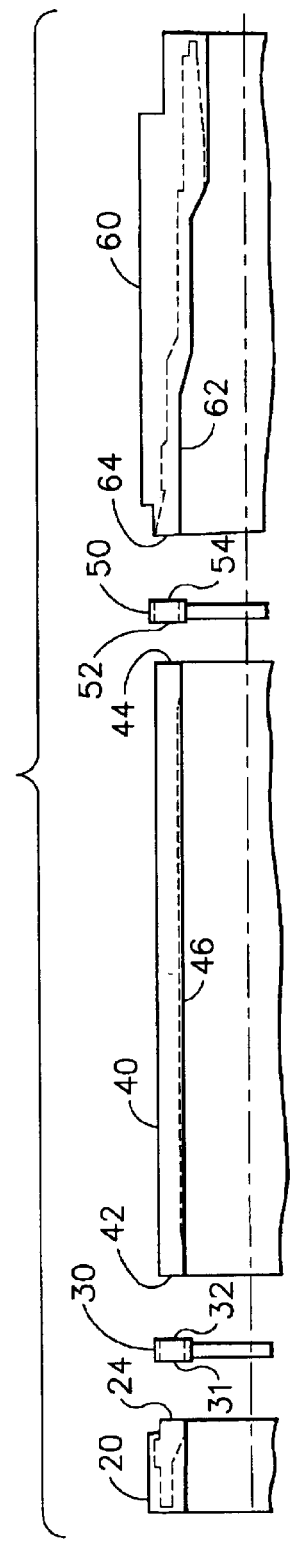
FIG. 2 shows an exploded view of the individual components of the shaft of FIG. 1.
Figures 3, 4:
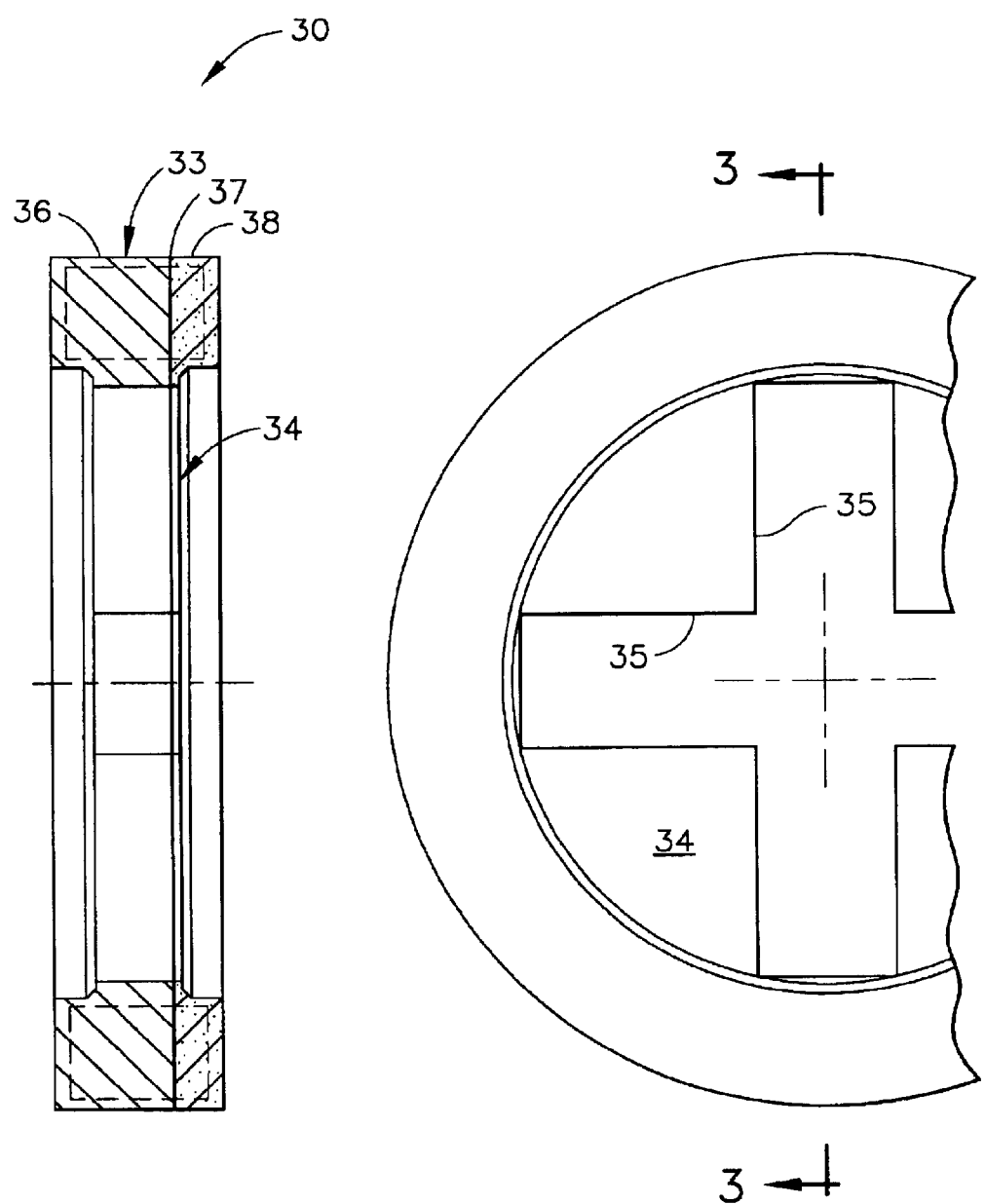
FIG. 3 shows a cross-sectional view of a transition piece for use with the present invention.
FIG. 4 shows a partial front view of the transition piece of FIG. 2.

Referring to FIGS. 3 and 4, the first transition piece 30 (which is also representative of the second transition piece 50) is a disk-shaped member comprising a barrier layer 37 interposed between a first end layer 36 and a second end layer 38. The first end layer 36 comprises an alloy which may be directly bonded to the forward or aft shafts, for example a nickel alloy, while the second alloy layer 38 comprises an alloy which may be directly bonded to the mid shaft 40, for example a titanium alloy. Any known alloy operative to prevent the formation of intermetallic compounds in the interface between the layers 36 and 38 may be used for the barrier layer 37. One suitable barrier alloy is a niobium-based alloy referred to as C103, which has a nominal composition in weight percent of 10 Hf, 1 Ti, 0.7 Zr, balance niobium. In the first transition piece 30 illustrated the three layers are metallurgically bonded together by a known explosive bonding process. Other methods of manufacture are also possible, for example rapid solidification plasma deposition could be used. The first transition piece 30 includes a rim 33 and a web 34 having a plurality of slots 35 formed therethrough. The slots 35 are arranged in a pattern that accepts one or more keys which are installed into and extend axially from a tooling adapter 70, which is described in detail below. The web 34 itself is removed after manufacture, leaving only the portion of the rim 33 shown with a dashed line in FIG. 3 as part of the finished shaft 10. As can be seen in FIG. 2, the combined thickness of the barrier layer 37 and the portion of the second end layer 38 that is contained within the web 34 represent only a small portion of the total thickness of the web 34, for example only about 10 percent in the illustrated example.

The transition pieces 30 and 50 are, relatively speaking, the weakest components of the shaft 10, because of the relatively low strength of the explosive bonded joint. Therefore, the transition pieces 30 and 50 must be processed in a manner to avoid any damage or weakening, in order to preserve an adequate overall margin of strength in the completed shaft 10. Furthermore, in order to obtain high strength levels in the monolithic forward and aft shafts 20 and 60, they must be properly heat treated, without subjecting the metal matrix composite components to excessive temperatures. These objectives are accomplished in the present invention by using a particular sequence of manufacturing operations and specialized tooling, which will now be described.

Figure 5:
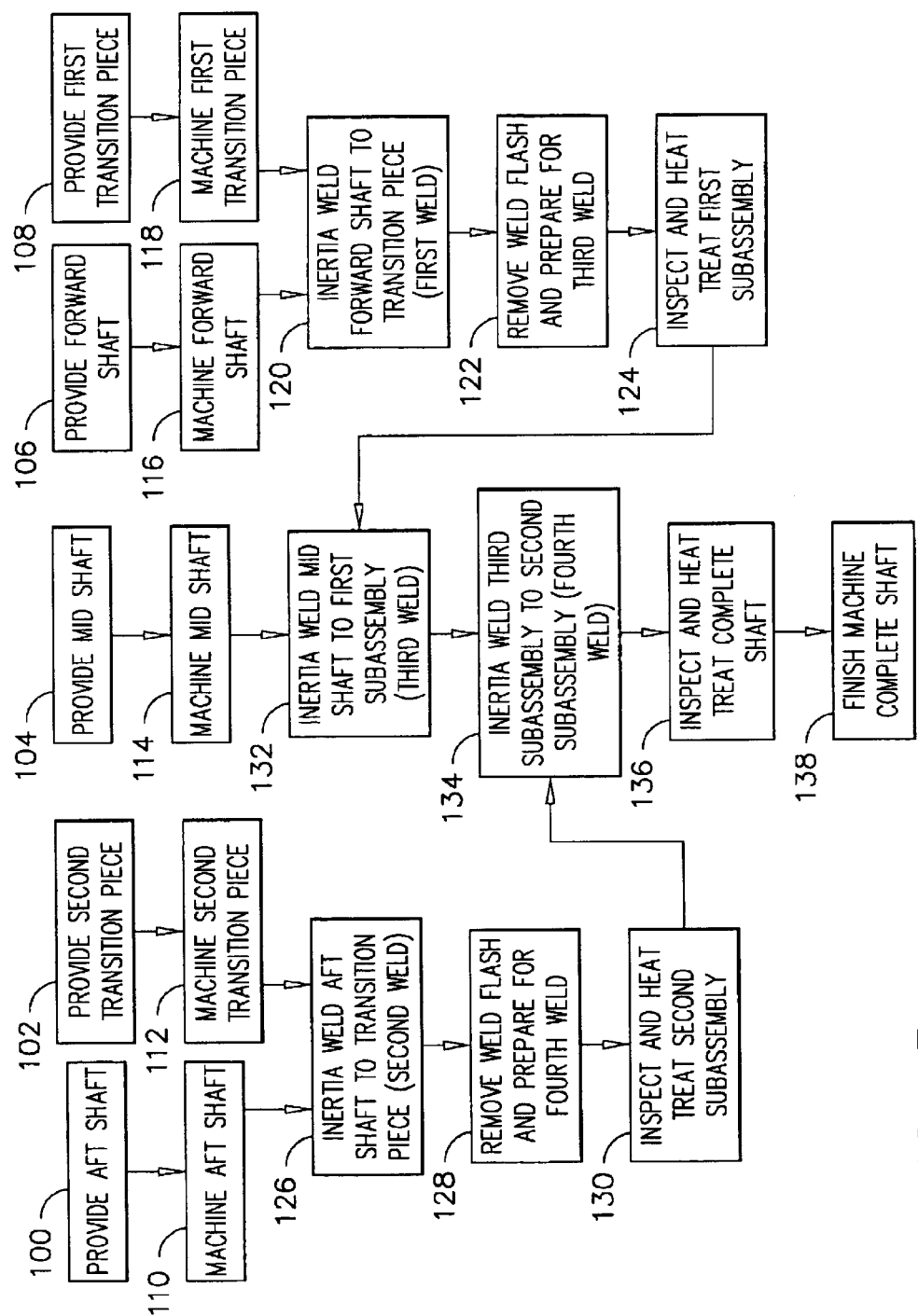
FIG. 5 is a block diagram of the method of the present invention.

The assembly process is illustrated in block diagram form in FIG. 5. Reference is also made to FIGS. 1 and 2 in which the individual components of the shaft 10 are shown assembled, and in an exploded view, respectively. Prior to any welding operations, the components of the shaft 10 are provided as shown in blocks 100, 102, 104, 106, and 108. The components are provided as annular structures, for example castings or forgings, having the general shape of the finished part and including extra material to be machined away in a subsequent process. The components are then pre-processed before any welding is performed, as shown in blocks 110, 112, 114, 116, and 118. The aft shaft 60 is machined (block 110) to bring its interior surface 62 close to its final dimensions, and to create a faying surface 64. The forward shaft 20 is then machined (block 116) to bring its interior surface 22 close to its final dimensions and to provide a faying surface 24. The first transition piece 30, which may be an explosive-bonded tri-alloy component as described above, is machined (block 118) to define first and second faying surfaces 31 and 32. The second transition piece 50, which may also be an explosive-bonded tri-alloy component as described in detail above, is also machined (block 112) to define first and second faying surfaces 52 and 54. Referring to block 114, the mid shaft 40 is machined to define first and second faying surfaces 42 and 44 at opposite ends thereof, and to bring its interior surface 46 near its final dimensions.

After the pre-weld machining steps are complete, the forward shaft 20 and the first transition piece 30 are mounted in an inertia friction welding machine (not shown) of a known type in which the two components to be joined are mounted respectively in a rotating headstock and a stationary tailstock. The tailstock may be moved axially towards the headstock to bring the faying surfaces of the components together and to apply a forge force while the headstock rotates. Any known inertia friction welding machine of adequate capacity may be used. One suitable inertia friction welding machine is a model 480B machine available from Manufacturing Technology Inc., 1702 West Washington, South Bend, Ind., 46628. The forward shaft 20 is mounted in the headstock using conventional tooling such as a tapered chuck which grips the forward shaft 20 by friction as the forge force is applied. After the components are mounted in the machine, a first inertia friction weld is completed to create a first subassembly (block 120). Because the first weld is a nickel-alloy-to-nickel-alloy weld, the expected shear stresses exceed the allowable shear stresses in the first transition piece 30, specifically, the allowable stress for the barrier layer 37. Therefore, the first weld is carried out using special precautions to avoid shear stresses in the first transition piece 30, specifically in the barrier layer 37. A special tooling adapter 70 (FIG. 6) is used in the stationary tailstock of the inertia welding machine to ensure that the welding torque is reacted primarily through the first end layer 36 of the first transition piece 30 and that little or no shear stress is generated between the layers 36, 37, and 38 of the first transition piece 30.

Figure 6:
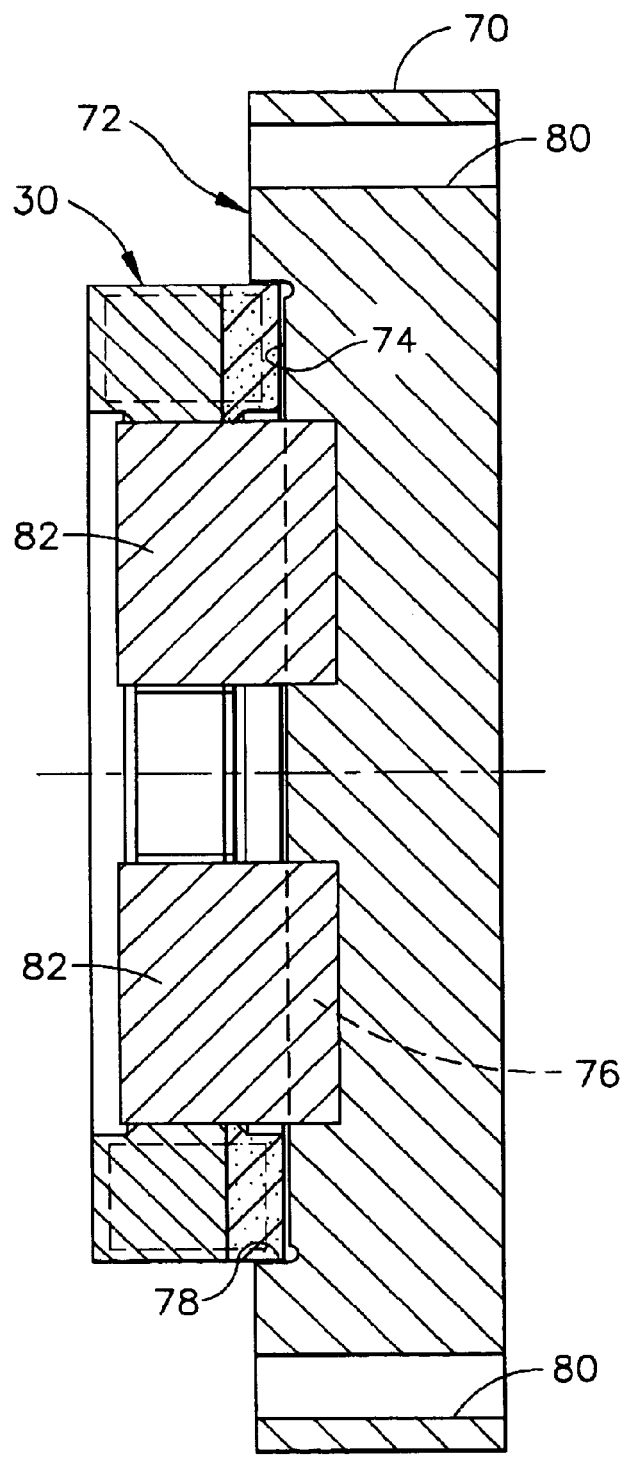
FIG. 6 shows a cross-sectional view of the transition piece of FIG. 3 installed in a tooling adapter.

FIG. 6 illustrates a cross-sectional view of the first transition piece 30 installed into the tooling adapter 70. The adapter 70 is a disk-shaped flat plate which is mounted to the tailstock of the inertia welding machine (not shown), for example using bolts through holes 80. The adapter 70 has a face 72, which has a pocket 74 formed therein. The pocket 74 receives the first transition piece 30. An outer edge 78 of the pocket 74 centers the transition piece 30. One or more slots 76 are formed in the adapter 70. The slots 76 have a pattern generally matching that of the slots 35 of the first transition piece 30, for example a cruciform pattern as shown in FIG. 3. One or more keys 82 are installed in the slots 76. The dimensions of the slots 35 and 76 and the keys 82 are chosen so that the keys 82 will be a relatively tight fit in the slots 76 (for example a light press fit), and a relatively looser fit in the slots 35, so as to allow the transmission of torque between the first transition piece 30 and the adapter 70 while permitting installation and removal of the first transition piece 30. The keys 82 have an axial length sufficient to extend through the web 34 of the first transition piece 30. The keys 82 bear against the layers 36, 37, and 38 simultaneously. Furthermore, because of the greater thickness of the first end layer 36, it transmits the majority of the force to the keys 82. Accordingly, little or no shear stress is generated in the joints between the layers 36, 37, and 38 when the welding torque is transmitted through the transition piece 30 to the tailstock. It should be noted that the function of the keys 82 and the slots 76 may be provided by a suitable array of pins and holes (not shown). The same function could also be provided with a combination of keys, slots, pins and holes, or other suitable means for transmitting torque loads.

After the first weld is completed, the first subassembly is removed from the machine and processed to remove weld flash as required (block 122). The web 34 of the first transition piece 30 may also be removed at this time, as it is no longer needed. The first weld is then inspected for flaws (block 124), for example by fluorescent penetrant inspection (FPI) or ultrasonic inspection. Subsequently, the first subassembly is subjected to an appropriate heat treatment cycle compatible with the nickel-based alloy. One suitable heat treatment cycle comprises heating the first subassembly to about 718° C. (1325° F.) and holding the temperature for 8 hours, cooling to about 593° C. (1100° F.) within 1 hour, holding the temperature at about 593° C. (1100° F.) for 8 hours, and subsequently cooling to ambient temperature.

The aft shaft 60 and the second transition piece 50 are joined in a manner similar to that used to join the forward shaft 20 and the first transition piece 30. After pre-weld machining as described above, the aft shaft 60 and the second transition piece 50 are mounted in an inertia welding machine and a second inertia friction weld is completed to create a second subassembly (block 126). The aft shaft 60 may be mounted in the tailstock using conventional tooling. The second transition piece 50 is mounted to the headstock of the inertia welding machine using a tooling adapter 70 and keys 82, as described in detail above. After welding, the second subassembly is removed from the machine and processed to remove weld flash as required (block 128). The web of the second transition piece 50 may also be removed at this time, as it is no longer needed. The second weld is then inspected for flaws, for example by fluorescent penetrant inspection (FPI) or ultrasonic inspection, at block 130. Subsequently, the second subassembly is subjected to an appropriate heat treatment cycle compatible with the nickel alloy. One suitable heat treatment cycle comprises heating the second subassembly to 718° C. (1325° F.) and holding the temperature for 8 hours, cooling to about 593° C. (1100° F.) within 1 hour, holding the temperature at 593° C. (1100° F.) for 8 hours, and subsequently cooling to ambient temperature.

Next, the mid shaft 40 and the first subassembly are mounted in the inertia welding machine and a third weld performed (block 132), resulting in a third subassembly which comprises the forward shaft 20, first transition piece 30, and the mid shaft 40. Because the third weld is a titanium-alloy-to-titanium-alloy weld, the expected shear stresses in the components are lower than those of the first and second welds. It is therefore acceptable to transmit the weld torque across the first transition piece 30 in a conventional manner, and accordingly the components are mounted in the welding machine using conventional tooling.

After the operations above are completed, the second subassembly and the third subassembly are mounted in the inertia welding machine (using conventional tooling), and a fourth inertia friction weld is completed at block 134, resulting in a welded assembly representing the complete shaft 10. The fourth weld is then inspected for flaws, for example by fluorescent penetrant inspection (FPI) or ultrasonic inspection. Subsequently, the shaft 10 is subjected to an appropriate heat treatment cycle compatible with the titanium MMC of the mid shaft (block 136). One suitable heat treatment cycle comprises heating the shaft 10 to about 593° C. (1100° F.) and holding the temperature for 2 hours or less. Subsequently, finish machining of the interior of the shaft 10 is completed (block 138). The exterior profile of the shaft 10 is also machined at this time.

Because all of the individual components are pre-machined before welding, very little machining of the interior of the shaft 10 is required at block 138, for example only weld flash removal and a light finish cut on the interior surfaces of the shaft 10. This represents a significant advantage to the sequence of the present invention. More specifically, because the mid shaft 40 has a larger inside diameter than that of the forward and aft shafts 20 and 60, machining the interior surface 46 of the mid shaft 40 requires a "bottle boring" technique, accessing the interior surface 46 through the interior of the forward or aft shafts, which is more complex and expensive than standard inside boring. If the shaft 10 were assembled before any machining was done, the amount of bottle boring would be significantly increased.

Figure 7:
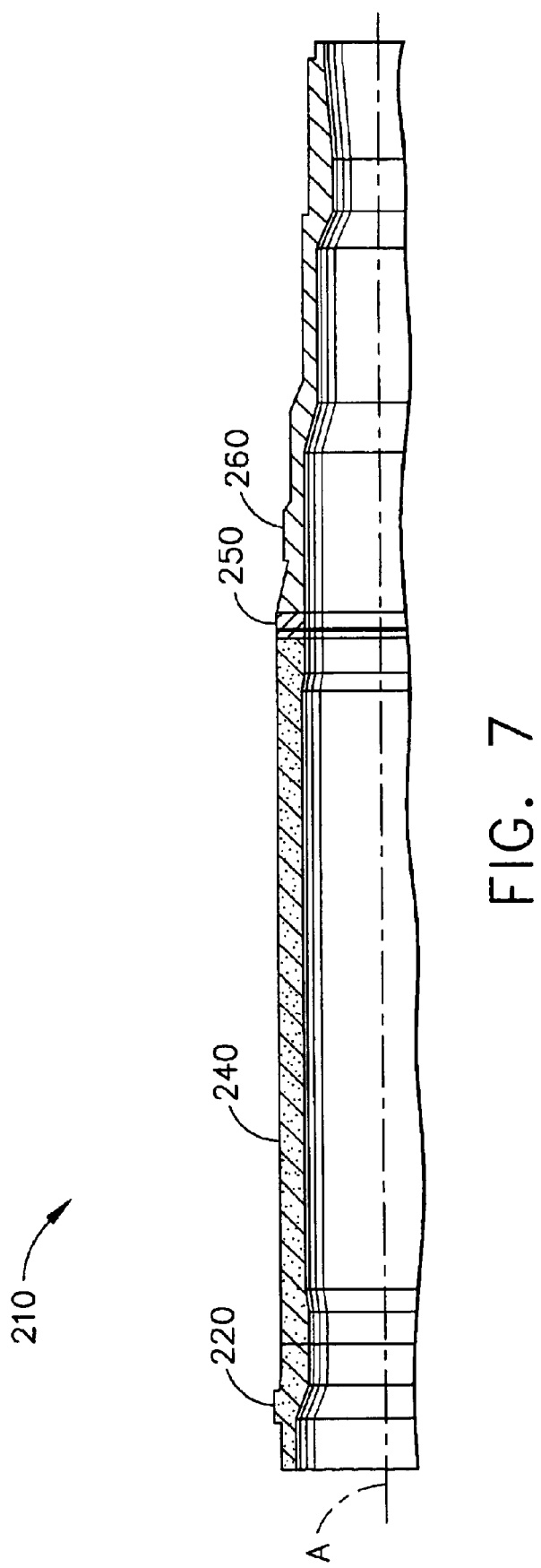
FIG. 7 shows a half cross-sectional view of an alternative embodiment of a shaft constructed in accordance with the present invention.

Other shaft configurations are also possible. For example, referring to FIG. 7, a shaft 210 is similar to shaft 10, being an assembly of several components including a forward shaft 220, a composite mid-shaft 240, an transition piece 250, and an aft shaft 260. In this configuration, the forward shaft 220 comprises a titanium alloy, and therefore may be inertia welded directly to the mid shaft 240 without the use of a transition piece. The manufacturing steps are otherwise similar to those of the shaft 10, including first welding the aft shaft 260 to the transition piece 250 to form a first subassembly, inspecting and heat treating the first subassembly, and welding the mid shaft 240 to the first subassembly to form a second subassembly. The forward shaft 220 is then welded directly to the second subassembly.

The processes and configurations described herein may be modified by one skilled in the art. For example, although the invention has been described using the terms "forward shaft" and "aft shaft", the positions of the components may be reversed. Additionally, the sequence of the pre-weld processing steps is not critical and they could be performed in a different order than that described. For example, the pre-weld machining of the forward and aft shafts could be performed simultaneously using more than one set of machining equipment.

The foregoing has described a method for assembling a shaft having a metal matrix composite mid shaft and monolithic high strength alloy forward and aft shafts. The forward and aft shafts are each inertia friction welded to separate annular transition pieces which include a barrier layer operative to prevent the formation of intermetallic compounds. Special tooling is used to avoid applying shear stresses to the transition piece during welding. The welded forward and aft subassemblies are subsequently heat treated before inertia friction welding them to the mid shaft. While specific embodiments of the present invention have been described, it will be apparent to those skilled in the art that various modifications thereto can be made without departing from the spirit and scope of the invention as defined in the appended claims.

What is claimed is:

1. A method of assembling a shaft, comprising:
   providing an annular first end shaft comprising a first alloy;
   providing an annular first transition piece, said first transition piece having a first end layer comprising said first alloy, a second end layer comprising a second alloy, and a barrier layer disposed between said first end layer and said second end layer;
   inertia friction welding said first end shaft to said first end layer of said first transition piece to form a first subassembly;
   heat treating said first subassembly;
   providing an annular mid shaft having first and second ends, said mid shaft made from a metal matrix composite material comprising said second alloy; and
   inertia friction welding said first end of said mid shaft to said second end layer of said first transition piece.

2. The method of assembling a shaft of claim 1 further comprising:
   providing an annular second end shaft comprising said second alloy; and
   inertia friction welding said second shaft to said forward end of said mid shaft.

3. The method of assembling a shaft of claim 1 further comprising:
   providing an annular second end shaft comprising said first alloy;
   providing an annular second transition piece, said second transition piece having a first end layer comprising said first alloy, a second end layer comprising said second alloy, and a barrier layer disposed between said first end layer and said second end layer;
   inertia friction welding said second end shaft to said first end layer of said second transition piece to form a second subassembly;
   heat treating said second subassembly; and
   inertia friction welding said second subassembly to said second end of said mid shaft.

4. The method of assembling a shaft of claim 1 wherein said first alloy is a nickel-based alloy.

5. The method of assembling a shaft of claim 1 wherein said second alloy is a titanium-based alloy.

6. The method of assembling a shaft of claim 1 wherein said first transition piece includes a central web having at least one slot formed therethrough, and wherein said step of inertia friction welding said first end shaft to said first end layer of said first transition piece includes restraining said first transition piece from rotation using at least one key, said key being disposed in said slot and attached to a tailstock of an inertia friction welding machine.

7. The method of assembling a shaft of claim 3 wherein said second transition piece includes a central web having at least one slot formed therethrough, and wherein said step of inertia friction welding said second end shaft to said first end layer of said second transition piece includes restraining said second transition piece from rotation using at least one key, said key being disposed in said slot and attached to a tailstock of an inertia friction welding machine.

* * * * *